US008805741B2

(12) United States Patent
Laverdière-Papineau et al.

(10) Patent No.: US 8,805,741 B2
(45) Date of Patent: Aug. 12, 2014

(54) CLASSIFICATION-BASED DIGITAL RIGHTS MANAGEMENT

(75) Inventors: Marc-André Laverdière-Papineau, Andhra Pradesh (IN); Deebika Sethuram, Tamil Nadu (IN)

(73) Assignee: Tata Consultancy Services Limited (IN)

(*) Notice: Subject to any disclaimer, the term of this patent is extended or adjusted under 35 U.S.C. 154(b) by 82 days.

(21) Appl. No.: 13/328,817

(22) Filed: Dec. 16, 2011

(65) Prior Publication Data

US 2013/0086693 A1 Apr. 4, 2013

(30) Foreign Application Priority Data

Sep. 30, 2011 (IN) ......................... 2806/MUM/2011

(51) Int. Cl.

*G06F 21/10* (2013.01)
*G06F 7/00* (2006.01)
*G06F 17/00* (2006.01)
*G06F 7/04* (2006.01)
*G06F 17/30* (2006.01)
*H04N 7/16* (2011.01)
*G06F 21/62* (2013.01)
*H04L 29/08* (2006.01)

(52) U.S. Cl.

CPC ............ *G06F 21/10* (2013.01); *G06F 21/6209* (2013.01); *H04L 29/0854* (2013.01); *H04L 29/08549* (2013.01)
USPC ............... 705/51; 705/57; 705/783; 707/609; 707/783; 726/30

(58) Field of Classification Search

CPC . G06F 21/10; G06F 21/6209; G06F 21/6218; H04L 29/0854; H04L 29/08549
USPC ............... 358/1.14; 713/181–182; 726/27–29
See application file for complete search history.

(56) References Cited

U.S. PATENT DOCUMENTS

| | | | | |
|---|---|---|---|---|
| 5,953,419 | A * | 9/1999 | Lohstroh et al. | 713/165 |
| 6,412,070 | B1 * | 6/2002 | Van Dyke et al. | 726/17 |
| 7,299,502 | B2 * | 11/2007 | Schmeling et al. | 726/29 |
| 7,716,490 | B2 * | 5/2010 | Kanai | 713/182 |
| 7,739,385 | B1 * | 6/2010 | Vinjamuri et al. | 709/226 |
| 7,849,328 | B2 * | 12/2010 | Blumenau | 713/189 |
| 8,107,100 | B2 * | 1/2012 | Abraham et al. | 358/1.14 |

(Continued)

FOREIGN PATENT DOCUMENTS

EP 1326157 7/2003

OTHER PUBLICATIONS

"European Application No. 11 19 4153, European Search Report issued Jan. 18, 2013", 2 pgs.

*Primary Examiner* — Saleh Najjar
*Assistant Examiner* — Feliciano Mejia
(74) *Attorney, Agent, or Firm* — Schwegman Lundberg & Woessner, P.A.

(57) ABSTRACT

The present subject matter relates to a device for digital rights management. The device includes a classification module that assigns a classification tag to a document. The classification tag is selected from a predefined classification scheme. Further, the device includes an access control module that checks a lock status of the document at a predefined time interval. The predefined time interval depends on the classification tag of the document. Further, the access control module locks the document based on the lock status.

19 Claims, 5 Drawing Sheets

(56) References Cited

U.S. PATENT DOCUMENTS 8,429,753 B2 * 4/2013 Skaria et al. .................... 726/27
2008/0018926 A1 1/2008 Abraham et al.
2009/0106247 A1 4/2009 Daughtry et al.
2010/0211829 A1 * 8/2010 Ziskind et al. .................. 714/48

* cited by examiner

CLASSIFICATION-BASED DIGITAL RIGHTS MANAGEMENT

CLAIM OF PRIORITY

This application claims the benefit of priority under 35 U.S.C. §119 of Marc-André Laverdiére-Papineau et al., Indian Patent Application Serial Number 2806/MUM/2011, entitled "CLASSIFICATION-BASED DIGITAL RIGHTS MANAGEMENT," filed on Sep. 30, 2011, the benefit of priority of which is claimed hereby, and which is incorporated by retrerice herein in its entirety.

TECHNICAL FIELD

The present subject matter relates, in general, to digital rights management and, particularly but not exclusively, to a device and a method for controlling access of protected documents.

BACKGROUND

In general, organizations, such as government agencies, financial institutions and professional companies, store and process their confidential information as documents which are stored in a digital format. Such confidential information may include product overviews, marketing plans, customer lists, and sales reports. In contrast to traditionally used print format, the digital format has improved the efficiency of handling the confidential information as well as maintaining its reliability. Organizations typically process the confidential information by sharing the confidential information in form of digital files through protected file servers, and distributing such digital files via downloads or email messages.

However, such digital files make the confidential information more vulnerable to unauthorized parties as the digital files are typically stored electronically on a central server within the organization, and external attackers or intruders may infiltrate into the organization through the organization's network to access such digital files. Further, apart from external attackers, people inside the organization, such as company employees having access to confidential information, may also disclose confidential information to non-trusted parties, either unintentionally or deliberately. Industry research indicates that leakage and theft of confidential information by internal attackers causes more damage to organizations all over the world than security breaches by external attackers.

SUMMARY

This summary is provided to introduce concepts related to digital rights management and these concepts are further described below in the detailed description. This summary is not intended to identify essential features of the claimed subject matter nor is it intended for use in determining or limiting the scope of the claimed subject matter.

In one implementation, a device for digital rights management is described herein. The device includes a classification module that assigns a classification tag to a document. The classification tag is selected from a predefined classification scheme. Further, the device includes an access control module that checks a lock status of the document at a predefined time interval. The predefined time interval depends on the classification tag of the document. Further, the access control module locks the document based on the lock status.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
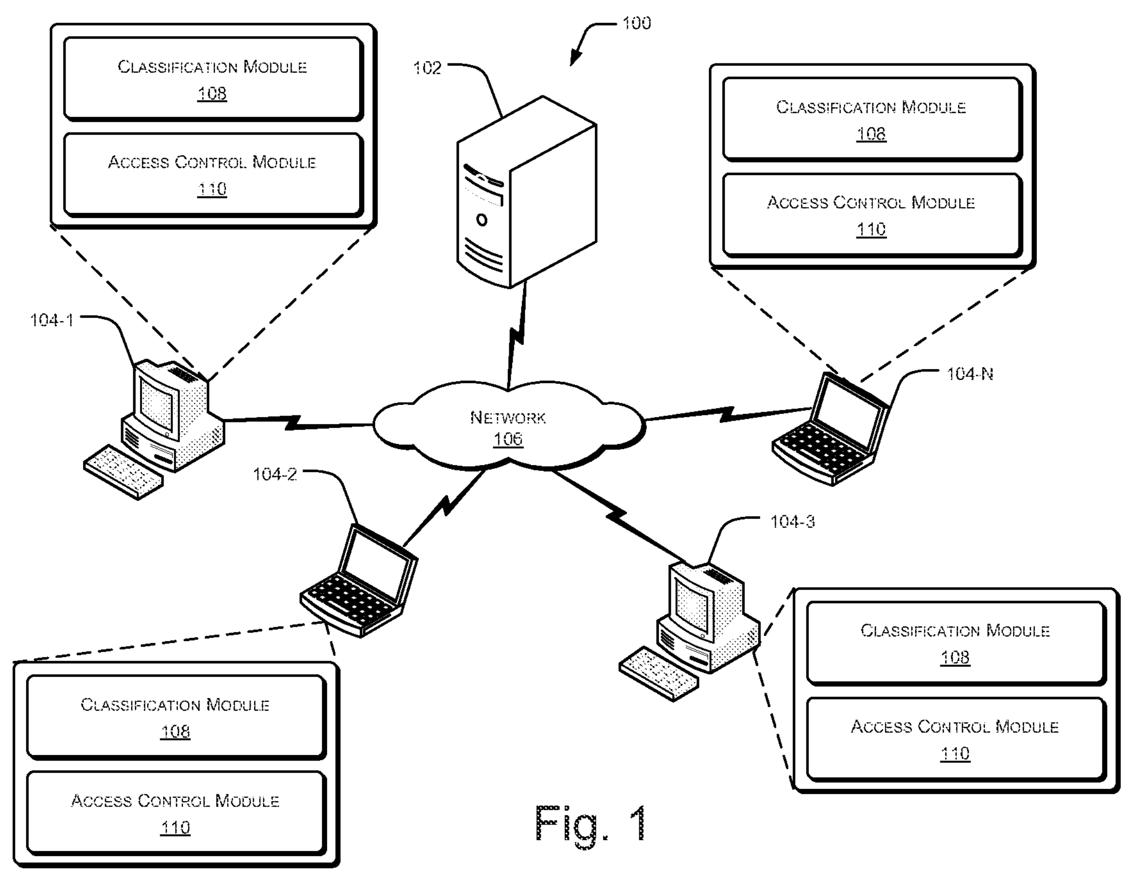
FIG. 1 illustrates a network environment implementing digital rights management (DRM) devices, according to an implementation of the present subject matter.

The present subject matter relates to a device and a method for digital rights management for protecting documents and controlling access of the protected documents. In one example, the documents may contain confidential information, such as product overviews, marketing plans, customer lists, and sales reports in digital format.

Conventional techniques used for protection of the documents within an environment, such as an enterprise environment, involve implementing password based encryption systems for securing the documents. However, the password based encryption systems do not provide effective protection to the documents, as passwords can be communicated orally or in a written form to other users. In such a scheme, or any other schemes relying exclusively on cryptography, there are no restrictions on actions that unauthorized users can perform on the documents. Therefore, protecting the documents using passwords or other cryptographic schemes makes the documents substantially vulnerable to unauthorized access.

Another conventional approach to protect the documents within the environment is to store the documents on a secured network, thus making the documents accessible only to authorized users. When the documents need to be duplicated or circulated, users seeking access typically follow secure administration procedures or policies. However, this approach is inadequate because the administration procedures are difficult to manage. Such procedures require extensive training and enforcement, and may also be expensive to implement and monitor. Also, these procedures are often ineffective because it is burdensome for users to review and modify the documents stored on the secured network. Therefore, the users tend to work on the documents stored on their personal computing devices. However, once the documents leave the computing device of the user, the above mentioned secured approach is no longer applicable and the administration procedures become ineffective.

Devices and methods for digital rights management (DRM) are described herein. The DRM device described herein enables users in an environment to protect one or more documents. The environment may include a public, such as an Internet, or a private environment, such as an enterprise environment. The DRM device, by default, protects a document by encrypting the document and restricting its access to a user without assignment of a specific right by an owner of the document. Therefore, to access the protected document, the owner of the document is required to assign the selective rights to a designated user. It may be understood that all the users have to be authorized to access the DRM device in the environment. Further, the DRM device restricts access to protected documents even if the protected documents leave the DRM devices of the users. The users can be divided into assignors and assignees. The assignors include document owners, temporary owners, and administrators, while the assignees can be any regular user having access rights of at least one protected document.

For the sake of clarity, a brief explanation to differentiate various users is provided. The administrators may be understood as users having administrative powers to control and manage access rights of owners, temporary owners, assignees, and access rights to DRM devices and/or the protected documents. The owners may be understood as users having ownership of at least one document and thus, the owner can protect the document, share the protected document with other users, assign access rights to other users for accessing the protected documents. Additionally, the owner and the administrator can temporarily assign the ownership of the protected documents to another user, The temporary owner may be understood as users having temporary ownership of at least one document. The assignees may be understood as regular users or a group of users having access rights of at least one protected document, without having the ownership of that document. Further, it may be understood that a user, at the same time may be an owner of a protected document, may be an assignee for another document, and yet may not have access rights to a different document. Therefore the term owner, assignee, or user is used with reference to a document.

In an implementation, more than one DRM device communicates with a DRM server. A plurality of users may use the DRM devices to protect documents, access the protected documents, and/or manage the protected documents. In an example, the users, such as owners, may use the DRM devices to protect the documents owned by them. The owners may protect the documents if the documents are required to be shared or circulated to the other users. In said example, the owners may also use the DRM devices to access the protected documents owned by them or received from other users. In another example, the assignees may use the DRM devices to access the protected documents received from owners and other users. In yet another example, the administrators may use the DRM devices to protect the documents, access the protected documents, and/or manage the protected documents. In addition to managing the protected documents, the administrators may also manage access rights of all the users and access rights to the DRM devices.

In an implementation, the DRM devices may be equipped with a secure viewer interface for protecting the documents. In said implementation, one or more DRM devices may also be equipped with an administrative interface for managing the protected documents, users, and/or other DRM devices. The secure viewer interface and the administrative interface may be implemented as graphical user interfaces (GUI). In an example, the regular users and the owners may be presented with the secure viewer interface, while the administrators may be presented with the secure viewer interface and the administrative interface. To protect a document, the owner of the document may select the document to be protected via the secure viewer interface of the DRM device. Based on the selection, the DRM device encrypts the document using cryptography techniques known in the art to generate the protected document.

In an implementation, the DRM device is configured to have a classification scheme having a plurality of classification tags that can be assigned to the document, depending on the level of sensitivity of contents of the document. The owner of the document, while protecting the document, can select one of the classification tags from the classification scheme and assign the classification tag to the document. Based on the classification tag of the document the DRM device overrides the rights of the owner to assign the access rights to a protected document or overrides the access rights already given to a protected document.

In an implementation, the original owner of the document and/or the administrator may be able to re-classify a protected document. With this, the classification tag of the document may be changed to a different classification tag from the previously assigned classification tag.

In an implementation, the restricted access rights for the protected document may depend on the type of classification tag assigned to the document. Further, the access rights to the user are also based on what rights are assigned by the owner of the protected document to that user for accessing the document. Such access rights define the extent of access to the protected document by the users. Examples of the access rights include, but are not limited to, a read access, a write access, a copy access, and a print access. The mentioned access rights enable the users to open the protected documents, make changes to the protected documents, copy text or capture screen snapshots of the protected documents, and print a hard copy of the protected documents, respectively.

In addition to defining access rights, the DRM devices in communication with the DRM server also provide other access control and security features, such as user and document locking, delegation of access rights, assigning of temporary ownership, and offline access, which may function depending on the classification tag of the protected document.

The user locking feature enables the administrator and the owner to lock a user, and the document locking feature enables the administrator and the owner to lock a document. Locking a user restricts the user from accessing the protected documents. Locking a protected document restricts all users from accessing the protected document, irrespective of the access rights the users hold over the protected document. In an implementation, the DRM device checks for a lock status of the documents and/or of the users at predefined time intervals. The predefined time interval, at which the checking of lock status is done, may depend on the classification tag of the protected document. With this, the documents having contents of a higher level of sensitivity may be checked for locking more frequently.

The delegation of access rights feature enables a user having access rights to a protected document, to delegate all of his access rights to another user. In an implementation, the delegation of access rights feature may be restricted based on the classification tag of the protected document. With this, the access rights to protected documents having contents of a substantially higher level of sensitivity may be delegated restrictively to the users or may not be delegated at all to any user.

The assigning of temporary ownership feature enables assigning of ownership rights, possessed by an owner, temporarily to a user for a certain time period. With this feature, an owner may be able to assign his rights for all the protected documents owned by him to another user on a temporary basis for a certain time period. In an implementation, the time period of temporary ownership may vary for each protected document on the basis of its classification tag. With this, the ownership of the protected documents, of an owner, with contents of a substantially higher level of sensitivity may be temporarily assigned restrictively to a user or may not be assigned at all to any user.

In another implementation, a user having access rights of a protected document may also be provided the required privileges to access the document in an offline mode for a certain time period. The offline mode may be understood to be an accessing mode in which the DRM device is not in communication with the DRM server. In an implementation, the time period for which the offline access is assigned may be dependent on the classification tag of the protected document. With this, the offline access of the protected documents having contents of a substantially higher level of sensitivity may be assigned restrictively to the users.

Further, in the implementation, where the protected documents may be re-classified by the owner and/or by the administrator, the access and security features for that document, as mentioned above, also get updated.

The DRM device of the present subject matter, therefore, enables the users to protect the documents and implement a fine-grained access control over the protected documents, even if the protected documents leaves the secured DRM devices of the user. With the DRM device a classification tag can be assigned to the document, and security and accessing attributes of the document get restricted depending on the classification tag. This saves the time and effort of the owner or the administrator in securing the documents and, furthermore, the owner/administrator need not give equal attention to non-sensitive documents.

The manner in which documents are protected and access to the protected documents is restricted is explained further in conjunction with FIGS. 1 to 4. It will be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. While aspects of devices and methods may be implemented in any number of different computing systems, environments, and/or configurations, the embodiments are described in the context of the following system architecture(s).

FIG. 1 illustrates a digital rights management (DRM) network environment 100, in accordance with an implementation of the present subject matter. The DRM network environment 100 includes a DRM server 102. The DRM server 102 may be implemented as any of a variety of computing devices, including, for example, a server, a workstation, and a mainframe computer. The DRM server 102 may be one, or combination of one or more, storage server or network server. The DRM server 102 is in communication with a plurality of DRM devices 104-1, 104-2, 104-3, . . . , 104-N, hereinafter collectively referred to as the DRM devices 104. The DRM devices 104 may be implemented as computing devices, such as a desktop PC, a notebook, a portable computer, a handheld computing device and a tablet.

The DRM devices 104 are connected to the DRM server 102 over a network 106 through one or more communication links. The communication links between the DRM devices 104 and the DRM server 102 are enabled through a desired form of communication, for example, via dial-up modem connections, cable links, and digital subscriber lines (DSL), wireless or satellite links, or any other suitable form of communication. In an implementation, the network 106 may be an enterprise network, including personal computers, laptops, various servers, such as blade servers, and other computing devices.

Further, the network 106 may also be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include network devices, such as network switches, hubs, routers, and Host Bus Adapters (HBAs), for providing a link between the DRM devices 104 and the DRM server 102. The network devices within the network 106 may interact with the DRM devices 104 and the DRM server 102 through the communication links.

The DRM devices 104 are configured to protect documents through encryption and restrict access to the protected documents by users. The documents may contain confidential information in digital format. In an implementation, the DRM device 104 includes a classification module 108 for assigning a classification tag to the document from a predefined classification scheme, and an access control module 110 for controlling access to the protected document by the users. The predefined classification scheme includes a plurality of predefined classification tags. The classification module 108 allows the owner or the administrator, while protecting a document, to assign a classification tag to the document depending on the sensitivity level of contents in the document. The classification scheme and the assigning of classification tag to the document are further elaborated later in the description. Based on the classification tag of the document, the DRM device can control the access and security of the document.

In an implementation, the access control module 110 allows assignors to selectively assign one or more access rights to the users. Such access rights define access to the protected document by the user. Examples of the access rights may include, but are not limited to, rights to open, edit, copy, and print the protected documents. The access rights for each of the document are restricted depending on the classification tag of the document. The access rights assigned by the assignors should not conflict with the access rights restricted based on the classification tag, as the classification tag is an overriding factor in restricting the access rights. This controlling of access rights, based on the classification tag is elaborated further in the description of FIG. 2.

In addition to allowing the assignors to assign access rights for the protected document to the users, the access control module 110 may lock/unlock user based on locking instructions received from an owner or an administrator. Also, the access control module 110 may lock/unlock the documents based on locking instructions provided by an owner or an administrator. Further, the access control module 110 may check for a lock status of the user and/or the document at predefined time intervals. The predefined time interval, at which the checking of lock status is done, is dependent on the classification tag of the protected document. Determining whether the document is locked or not, based on the classification tag, is further elaborated later in the description.

Further, the access control module 110 may delegate the access rights of one user to another user. For example, if an owner assigns rights to open and edit to an assignee, the assignee may further delegate these access rights to another user. The delegation of access rights may depend on the classification tag of the protected document. This delegation of access rights, based on the classification tag, is further elaborated later in the description.

Further, the access control module 110 may assign temporary ownership of the documents from an owner to another user for a predefined time period. The users with temporary ownership are provided with all the access rights and authorities of the owner, except authority to assign temporary ownership, and modify the time period of the temporary ownership. In an implementation, the time period of the temporary ownership may be dependent on the classification tag of the protected document. The assigning of temporary ownership, based on the classification tag, is further elaborated later in the description.

Furthermore, the access control module 110 may allow the user, having access rights for the protected document, to access the document in offline mode. In this, the user, having access rights for a protected document, may access the document on the DRM device even with the DRM device not in communication with the DRM server 102. The access control module 110 may assign the offline access to the user for a predefined time period. After the expiry of the time period, it is not possible for the user to access the document in the offline mode even if he has the access rights with him. The time period for which the user can have the access the documents offline depends on the classification tag of the protected document. This offline accessing of the protected document, based on the classification tag, is further elaborated later in the description.

Figure 2:
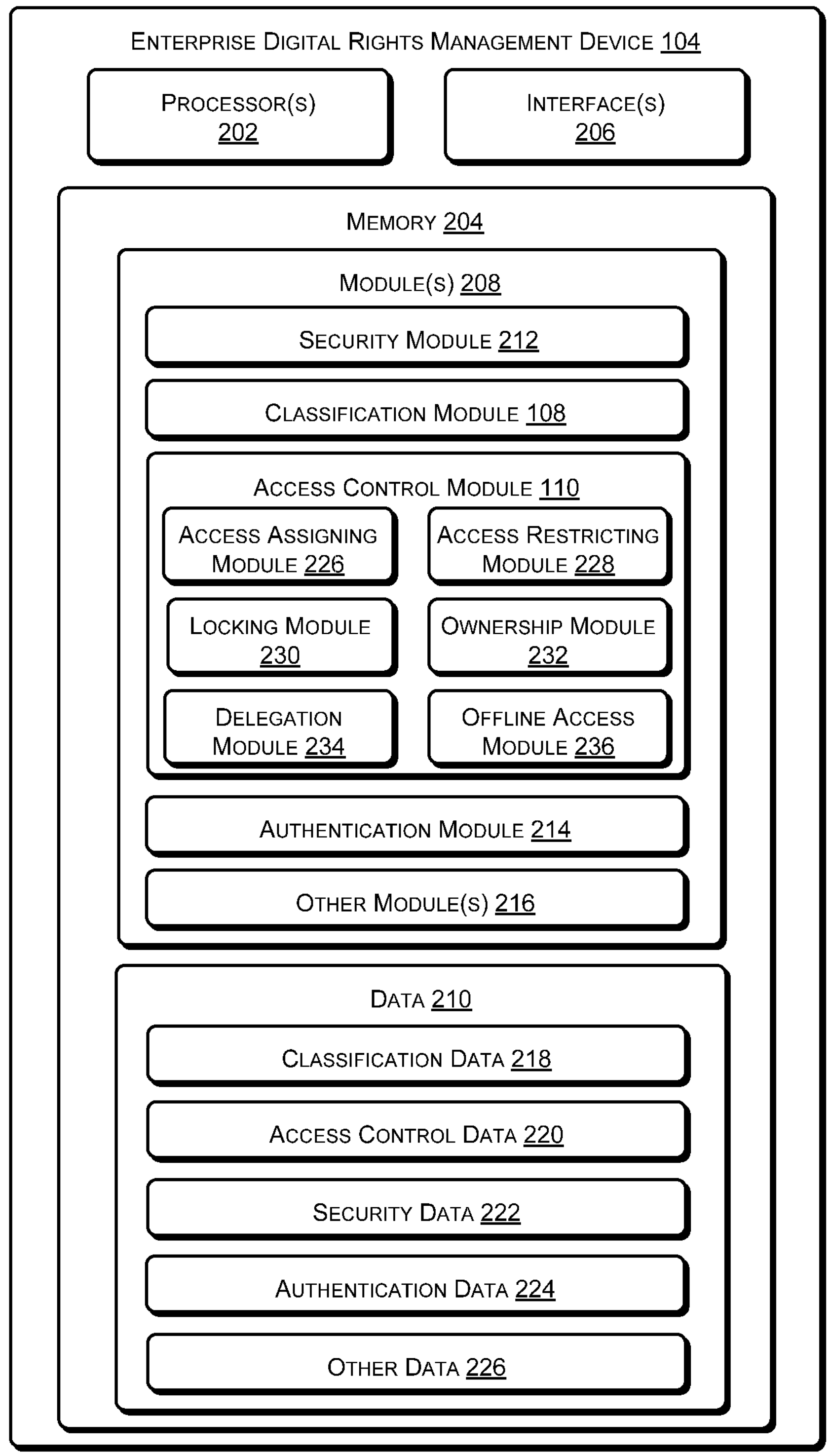
FIG. 2 illustrates components of a DRM device, according to an implementation of the present subject matter.

FIG. 2 illustrates components of the DRM device 104, according to an implementation of the present subject matter. In said implementation, the DRM device 104 includes one or more processor(s) 202, a memory 204 coupled to the processor(s) 202, and interface(s) 206.

The processor(s) 202 can be a single processing unit or a number of units, all of which could include multiple computing units. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 is configured to fetch and execute computer-readable instructions and data stored in the memory 204.

The interfaces 206 may include a variety of software and hardware interfaces, for example, interface for peripheral device(s), such as a keyboard, a mouse, an external memory, a printer, etc. Further, the interfaces 206 may enable the DRM device 104 to communicate with other computing devices, such as web servers and external databases. The interfaces 206 may facilitate multiple communications within a wide variety of protocols and networks, such as a network, including wired networks, e.g., LAN, cable, etc., and wireless networks, e.g., WLAN, cellular, satellite, etc. The interfaces 206 may include one or more ports to allow communication between the DRM devices 104 and the DRM server 102.

The memory 204 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 204 also includes module(s) 208 and data 210.

The modules 208 include routines, programs, objects, components, data structures, etc., which perform particular tasks or implement particular abstract data types, one implementation, the modules 208 include a security module 212, the classification module 108, the access control module 110, an authentication module 214, and other modules 216. The access control module 110 further includes an access assigning module 226, an access restricting module 228, a locking module 230, an ownership module 232, a delegation module 234 and an offline access module 236. The other modules 216 may include programs or coded instructions that supplement applications and functions, for example, programs in the operating system of the DRM device 104.

The data 210, amongst other things, serves as a repository for storing data processed, received, and generated by one or more of the module(s) 208. The data 210 includes classification data 218, access control data 220, security data 222, authentication data 224, and other data 226. The other data 226 includes data generated as a result of the execution of one or more modules in the other modules 216.

The DRM device 104, in accordance with the present subject matter, provides two levels of security to the documents. The DRM device 104 achieves a first level of security by authenticating the identity of the user and encrypting the documents, using cryptographic techniques, to generate the protected documents. Also, the DRM device 104 achieves a second level of security by controlling access to the protected documents. The entire security procedure implementing both the levels of security is explained in detail under the following sections, viz., user authentication, document encryption, document classification and access control.

User Authentication

In operation, the DRM device 104 receives login credentials from the user. The login credentials may include, for example, a user ID and a password. Based on the login credentials, the DRM device 104 authenticates the user. Such authentication may be performed using authentication techniques known in the art, such as existing Lightweight Directory Access Protocol (LDAP) Directories.

In operation, the authentication module 214 authenticates the user based on the received login credentials. The authentication module 214 performs such authentication by comparing login credentials entered by the user with login credentials pre-stored in the authentication data 224. If comparison indicates that the login credentials provided by the user are correct, the user is authenticated and access to the DRM device 104 is allowed. On the other hand, if the comparison indicates that the login credentials provided by the user are incorrect, the user authentication fails and access to the DRM device 104 is restricted until the correct login credentials are entered by the user. It is to be understood that the authentication data 224 is shown within the data 210 for the purpose of clarity. However, such authentication data 224 may also be placed in an external repository associated with the DRM device 104. For example, the authentication data 224 may be stored in an LDAP server (not shown), if the authentication is performed using LDAP Directories.

Document Encryption

The DRM device 104 may receive a document protection request from an owner (an authenticated user) for protecting a document. The DRM device 104, for example, may be equipped with a secure viewer interface via, which the owners browse and select the documents to be protected. Once the document to be protected is selected by the owner, the security module 212 protects the document. In operation, the security module 212 generates two copies of the security key. In an implementation, the security module 212 generates the unique security key for each document. The security module 212 saves a copy of the security key in the security data 222 and sends another copy of the security key to the DRM server 102. Once the security key is sent to the DRM server 102, the security module 212 retrieves a document identifier (ID) generated by the DRM server 102. The document ID also gets stored within the DRM server 102. The security module 212 then encrypts the document using the security key alone or in combination with the document ID to generate the protected document. Along with the document ID, the DRM server 102 also stores a user ID of the user whose document is to be protected. The DRM server 102 may store the user ID and the document ID information, for example, in form of a user and document table.

In addition to the security key, the security module 212 may also store metadata pertaining to the protected documents in the security data 222. Examples of meta data include, but are not limited to, magic number, file version number, encrypted security key, and document initialization vector.

The protected documents generated by the security module 212 may be thereafter distributed or shared with one or more other users. For example, the owner can share the protected documents with other users via electronic mail and/or any file sharing method known in the art.

Document Classification

The DRM device 104 may receive a request from an owner (an authenticated user) for assigning a classification tag to a document to be protected. The classification tag may be assigned from a predefined classification scheme. In an example, the classification scheme may include a plurality of classification tags, such as Very_Secret, Secret, Sensitive, Less Sensitive and Public. The owner may select one of the classification tags depending on the level of sensitivity of contents of the document, and the classification module 108 assigns the selected classification tag to the document. For example, a document with very high sensitivity may be assigned the classification tag 'Very_Secret', a document with moderate sensitivity may be assigned the classification tag 'Sensitive', and a document with no sensitivity may be assigned the classification tag 'Public'. In an implementation, the classification scheme may include any customized number of classification tags. However, for the sake of easy understanding of the implementations described herein, the classification scheme may be considered to have the above mentioned classification tags. In on implementation, the classification tag may be assigned while creating the document. In an implementation, the classification tag may be assigned before or after the encryption of the document.

Further, the classification module 108 assigning the classification tag to the document stores the tag in the classification data 218. Based on the classification tag assigned to the document, the access and security features of the DRM device may be controlled.

In an implementation, the DRM device 104 allows the document owner or administrator to change the classification tag assigned to a document. The modified classification tag is assigned to the document by the classification module 108. The selection of classification tag by the administrator will supersede the previous classification tag. With the change in the classification tag, the access rights, the access control features and the security features get updated based on the new classification tag.

Access Control

In one implementation, the access of the protected documents is controlled by assigning one or more access rights to the users if the protected documents need to be circulated to the users. The access rights may depend on the classification tag of the protected document and the type of user owner, temporary owner, regular user or administrator) accessing the protected document. Further, the access is controlled by locking user/documents, delegating the access rights to other users, assigning ownership rights of an owner temporarily to a user if the owner is temporarily unavailable, and providing offline access to users all based on the classification tag of the protected document. The manner in which the access control may be achieved is explained in detail in the following subsections, viz., assigning access rights, locking user/document, delegating access rights, assigning temporary ownership, and offline access.

Assigning Access Rights

In an implementation, the access rights include rights mentioned in Table 1 below. Table 1 also mentions codes for each access right, which may be used in the description hereinafter. It is to be understood that the types of access rights described in Table 1 are only for the purpose of explanation and various other types of access rights may also be implemented.

TABLE 1

| Access Right | Code | Description |
|---|---|---|
| Open | O | User can open a protected documents |
| Edit | E | User can edit or modify data in the protected documents |
| Copy | C | User can copy data from the protected documents and/or can take screen snapshots of the protected documents |
| Print | P | User can print the protected documents |

Table 2, provided below, lists details of predefined access rights that may be allowed to assign to the various types of users for accessing the protected document depending on the classification tag, according to an implementation. The assignors may not be able to assign access rights that are in conflict with the predefined access rights detailed in Table 2. Following Table 2, for the document with the classification tag 'Secret', the owner of the document may get rights to open, edit, copy and print, the temporary owner may get rights to open and edit, whereas the regular user may get rights to open only. For the document with the classification tag 'Sensitive', the owner and the temporary owner may get rights to open, edit, copy and print, whereas the regular user may get rights to open and edit only. The administrator(s) gets all the access rights for all the documents, as mentioned in Table 2. It is to be understood that the combinations of access rights described in Table 2 are only for the purpose of explanation, and other combinations of access rights may be implemented.

In an implementation, the assignors, such as the owners and the administrators, may selectively assign the access rights to the other users. The assignors may selectively assign the rights based on their choice and which are not in conflict with Table 2. For example, a regular user may be provided with access right to open only or open and edit a 'Sensitive' document. The assignor may not be able to assign rights to copy and/or print the 'Sensitive' document to any regular user. In another example, a regular user may be provided with access right only to open a 'Secret' document. The assignor may not be able to provide any other access rights like edit, copy and/or print the 'Secret' document to the regular user.

TABLE 2

| Classification Tag | Access Rights Owner | Temporary Owner | Regular use | Administrator |
|---|---|---|---|---|
| Very_Secret | O, E | O | — | O, E, C, P |
| Secret | O, E, C | O, E | O | O, E, C, P |
| Sensitive | O, E, C, P | O, E, C, P | O, E | O, E, C, P |
| Less_Sensitive | O, E, C, P | O, E, C, P | O, E, C | O, E, C, P |
| Public | O, E, C, P | O, E, C, P | O, E, C, P | O, E, C, P |

In an implementation, in case the assignor assigns access rights that conflict with the predefined access rights based on the classification tag, such access rights to the user may be denied by the DRM device 104. For example, following Table 2, if the owner assigns rights to edit a 'Secret' document to a user, such access right of editing may be denied by the DRM device 104.

The information pertaining to the assignment of the access rights assigned by the assignors is stored in the access control data 220 in the DRM device 104 and in the DRM server 102. In an implementation, the DRM device 104 and/or DRM server 102 may be associated with repositories for storing such access rights assignment information. The repositories may be external repositories associated with the DRM device 104 and the DRM server 102. In operation, the access assigning module 226 assigns access rights to a user or a group of users, as assigned by the assignors.

In addition, in an implementation, the access assigning module 226 may allow the assignors to update the assigned access rights. For this, the assignors may provide updation instructions. The updation instructions may include instructions for granting one or more new access rights to the users and revoking one or more previously granted access rights to the user. The updated access rights should not be in conflict with the access rights restrictions based on the classification tag. Based on the updation instructions, assignment of the access rights is updated and access rights assignment information in the DRM server 102 is updated with the new access right assignment information.

Locking User/Documents

In an implementation, the DRM device 104 allows the administrators to lock any other user or the protected document. Further, the DRM device 104 allows the owners to lock any protected document which they own or any other user. Locking a user may be understood as preventing a user from accessing the protected documents, irrespective of the access rights the users holds over the protected documents. For example, if a user has access to open and edit the protected documents, and the user is locked by the administrator or the owner, any access request from the locked user for accessing the protected documents will not be entertained. In case the protected documents have already been opened at the DRM device 104, the user's access to the protected documents is forcefully terminated and an alert message, such as "user is locked" may be displayed to the user on the DRM device 104. When the user is unlocked by the administrator or the owner, any further access request by the user for accessing the protected documents may be accepted, if the user is holding the access rights. It is to be understood that locking the user does not modify the access rights of the user.

On the other hand, locking a protected document may be understood as preventing any user from accessing the protected document, irrespective of the access rights the users are holding over the protected document. In the event that a locked protected document is already open at one or more DRM devices 104, the user's access to the protected document will be forcefully terminated.

In an implementation, each document and each user has a lock status. By-default the lock status for the protected documents and the users is 'Not_Locked'. The lock status changes to 'Locked' once the owner or the administrator decides to lock the user or the document. For documents the lock status is associated with the corresponding document IDs, and for users the lock status is associated with the corresponding user IDs. The locking module 230 stores the lock status along with the document IDs and the user IDs for the locked documents and the locked users, respectively, in the access control data 220 in the DRM device 104 and the DRM server 102. In operation, the locking module 230 locks the users and/or the protected documents based on the corresponding lock status, the user IDs and the document IDs.

Further, the locking module 230 is configured to monitor the lock status of the users and the protected documents. The monitoring includes checking of the lock status at predefined time intervals, to determine if the user ID or the document ID is locked. If the lock status indicates that the user ID or the document ID is locked, the already open documents will be forcefully closed. Such checking of the locking information at regular intervals is referred to as polling mechanism. In an implementation, the predefined time interval has a range during which period the lock status is checked. In said implementation, the lock status is checked during the time which is based on the predefined time interval range. With this, the lock statuses for all the user and/or documents are not checked simultaneously, which may advantageously reduce on the resources the peak load of monitoring the lock status.

TABLE 3

| Classification Tag | Time Interval for monitoring lock status | Predefined time interval range |
|---|---|---|
| Very_Secret | 5 minutes | 5 minutes ± 2% |
| Secret | 30 minutes | 30 minutes ± 5% |
| Sensitive | 4 hours | 4 hours ± 10% |
| Less_Sensitive | 24 hours | 24 hours ± 15% |
| Public | Not Applicable | Not Applicable |

Further, the locking module 230 is configured to monitor the lock status of the protected documents based on the classification tags of the documents. The predefined time intervals of checking the lock status of the documents depends on the classification tag of the document. Table 3 lists the details of the time intervals for each classification tag, according to an implementation. Following Table 3, for the document with the classification tag 'Very_Secret', the time interval may be 5 minutes, and for the document with the classification tag 'Sensitive', the time interval may be 4 hours. Further, for a 'Public' document the lock status is not checked at all. If the lock status indicates that the user ID or the document ID is locked, the already open documents will be forcefully closed. If the locked document is not open then the users will be denied the access of the locked document. Table 3 further lists the predefined range for each time interval based on the classification tag for checking the lock status, according to an implementation. For the document with the classification tag 'Secret', the range may be 30 minutes ±5% of the predefined level. This implies that the lock status of the 'Secret' document is checked at a time interval between a range from 28.5 minutes to 31.5 minutes. It is to be understood that the time intervals and ranges in Table 3 are only for the purpose of explanation, and other time intervals and ranges may be implemented.

Delegating Access Rights

In an implementation, the DRM device 104 allows the regular users, having certain access rights for protected documents, to delegate all of the access rights they are holding to the other regular users. In other words, an assignee having certain access rights for a protected document can become an assignor and pass his access rights on to another user for accessing the same document. In an example, if a regular user has rights to open and edit a protected document the regular user may further delegate, such assigned rights to another regular user. It is to be understood that the user who delegates the access rights is referred to as delegator, and the user who receives the delegated access rights is referred to as delegatee.

In operation, the delegation module 234 delegates the access rights based on delegation information received from the delegator. The delegator specifies the delegatee to whom the access rights are to be delegated. The delegation module 234 receives the delegation information from the delegator and delegates the access rights of the delegator to the delegatee. The delegation module 234, thereafter, stores the delegation information in the access control data 220 of the DRM device 104 and the DRM server 102. The delegation information may include, for example, the document ID for which the access rights are delegated, the delegator ID, and the delegatee ID. It is to be understood that the delegator ID is the user ID of the user who is delegating the access rights, and the delegatee ID is the user ID of the user who is receiving the delegated access rights.

Further, the regular users may be able to delegate the access rights to the other regular users based on the classification tag of the protected document. Table 4 lists the details of whether the delegation of access rights is possible or not for each classification tag, according to an implementation. Following Table 4, for the document with the classification tag 'Very_Secret', the regular users may not be able to delegate their access rights to the other regular users, and for the document with the classification tag 'Sensitive', the regular users may be able to delegate their access rights to other regular users. It is to be understood that the possibilities of delegation of access rights in Table 4 are only for the purpose of explanation, and other possibilities may be implemented.

TABLE 4

| Classification Tag | Delegation of Access Rights |
|---|---|
| Very_Secret | No |
| Secret | No |
| Sensitive | Yes |
| Less_Sensitive | Yes |
| Public | Yes |

Assigning Temporary Ownership

In an implementation, the DRM device 104 allows the owners to assign their ownership rights temporarily to another user for a certain period of time. In an implementation, the administrators may also be able to assign such ownership rights on temporary basis to a user. With this, the owner is able to assign temporary ownership of the protected documents he owns to any other user if the owner is going on a leave. The user to whom a temporary ownership is assigned is known as a temporary owner. The temporary owner has all the rights for all the protected documents of the original owner, except the right to change the time period of his temporary ownership and to assign the temporary ownership to the other users.

Further, the possibility of assigning the temporary ownership and the time period for which the temporary owner possesses the temporary ownership depend on the classification tags of the documents. Table 5 lists the possible time periods based on the classification tags, according to an implementation, for which the temporary owner may possess the temporary ownership. Following Table 5, for the document with the classification tag 'Very_Secret', the temporary owner may not be able to possess the temporary ownership, whereas for the document with any other classification tags, of lower sensitivity, the temporary owner may be able to possess the temporary ownership for the time period set by the original owner or the administrator. In this, the owner or the administrator while selecting for assigning the temporary ownership may have to set the time periods. It is to be understood that the possibilities of time periods in Table 5 are only for the purpose of explanation, and other possibilities may be implemented.

TABLE 5

| Classification Tag | Time Period of Temporary Ownership |
|---|---|
| Very_Secret | Not Possible |
| Secret | Owner/Administrator defined |
| Sensitive | Owner/Administrator defined |
| Less_Sensitive | Owner/Administrator defined |
| Public | Owner/Administrator defined |

In operation, the ownership module 232 assigns the temporary ownership from an owner to a user based on the ownership assignment instructions. The ownership assignment instructions may include, for example, a temporary owner ID, and time periods of various documents with different classification tags for which the ownership is to be assigned. Subsequent to assigning the ownership, the ownership module 232 stores the information related to assignment of the temporary ownership, such as the temporary owner ID and the time periods in the access control data 220 of the DRM device 104 and the DRM server 102.

It is to be understood that when the temporary ownership is active, the temporary owner may enjoy the access rights of the owner. Once the time period of the temporary ownership of a protected document expires, the temporary owner shall not be able to possess the ownership rights of that document. However, the temporary owner may be able to access the document as a regular user if the access rights were assigned or delegated to him.

Offline Access

In an implementation, the DRM device 104 allows users, having access rights for the protected document, to access the document in offline mode. In this, the user, having access rights for a protected document, may access the document on the DRM device even with the DRM device not in communication with the DRM server 102. The offline access module 236 may allow the offline access to the user for a predefined time period. After the expiry of the time period, it is not possible for the user to access the document in the offline mode even if he has the access rights with him.

Further, the time period for which the user can have the offline access depends on the classification tag of the protected document. Table 6 lists the possible time periods for which the users may be able to access the documents offline, according to an implementation. Following Table 6, for the document with the classification tag 'Secret', the administrator may provide offline access to the document for an indefinite period of time or for fixed periods, such as one day. In such a case, other users may not be able to access the document offline, whereas for the document with the classification tag 'Sensitive', the administrator may allow offline access the document any time for the owner, the temporary owner may be provided offline access for three day, whereas the regular users may not be able to access the document offline at all. It is to be understood that the possible time periods for offline access in Table 6 are only for the purpose of explanation, and other possible time periods may be implemented.

TABLE 6

| | Time periods for Offline Access | | | |
|---|---|---|---|---|
| Classification Tag | Owner | Temporary Owner | Regular user | Administrator |
| Very_Secret | Not Possible | Not Possible | Not Possible | Not Possible |
| Secret | 1 day | Not Possible | Not Possible | Any Time |
| Sensitive | 3 days | 3 days | Not Possible | Any Time |
| Less_Sensitive | 10 days | 10 days | 5 days | Any Time |
| Public | Any Time | Any Time | Any Time | Any Time |

In operation, the offline access module 236 allows the offline access of the protected document. For the purpose of offline access of the protected document on the DRM device 104, the protected document may be downloaded from the DRM server 102 or may be sent by the assignor, which includes the owner, the administrator and the temporary owner, to the user. In the process of downloading the document or sending the document the metadata, the access control data and the security data, associated with the document are transferred along with the document. The document and the other mentioned details of the document are stored locally in the data 210 in the DRM device 104 of the user.

It is to be understood that in addition to the access control features described above, other access control features, such as permanent transfer of ownership, time shifting portability, space shifting portability, platform shifting portability, etc., may also be implemented. For the sake of clarity a brief explanation of such additional features is provided.

Permanently transferring ownership can be understood as transferring of ownership rights from one user to other user. For example, if a user leaves an organization, the ownership of the user may be transferred to some other user. Time shifting can be understood to include enabling the users to access the protected documents at the time when they want to. On the other hand, space shifting portability enables the users to freely access the protected documents on any computing device they want. Similarly, platform shifting portability enables the users to use different operating systems to access the protected documents.

Figure 3:
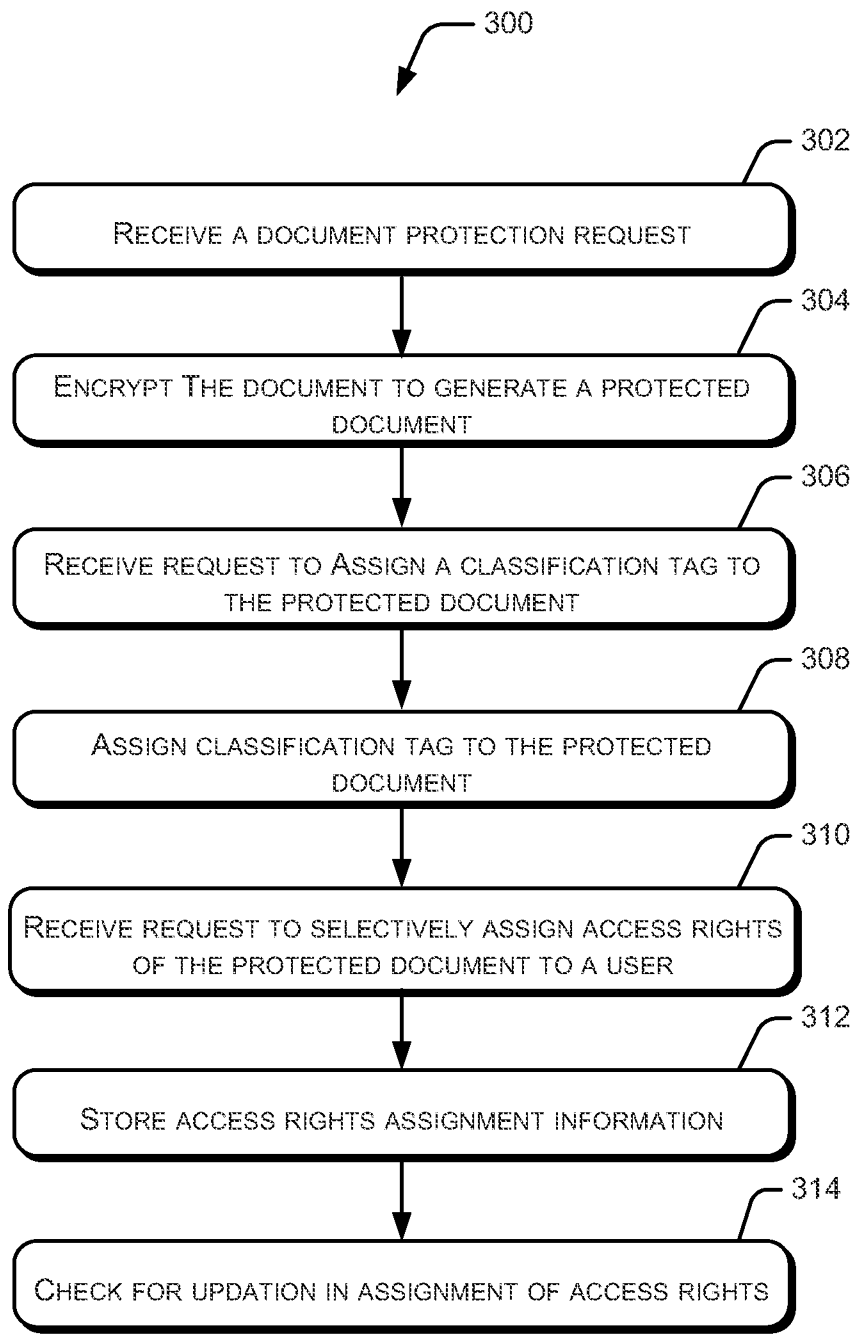
FIG. 3 illustrates a method for protecting documents using a DRM device, according to an implementation of the present subject matter.
Figure 4A:
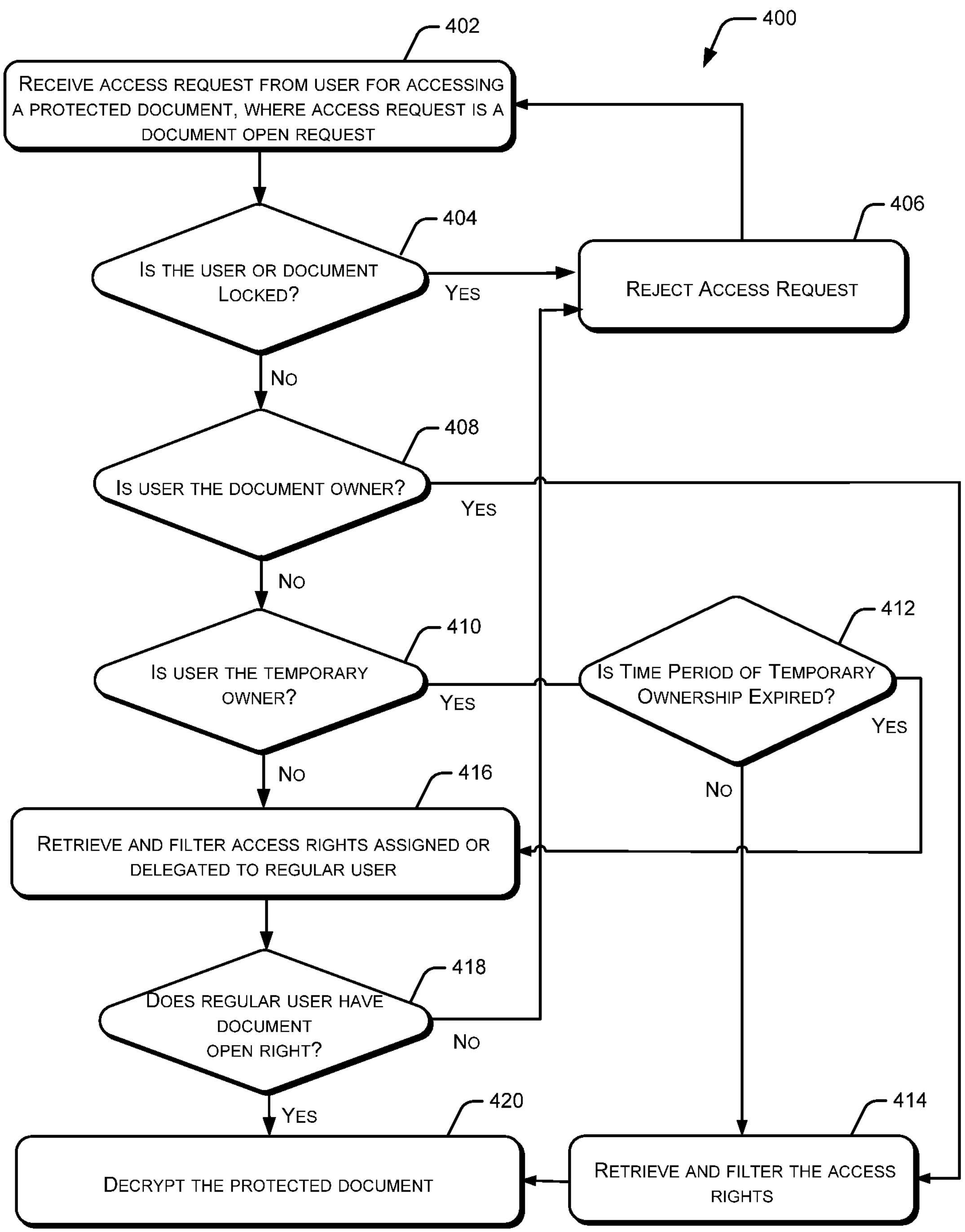
FIGS. 4(*a*) and 4(*b*) illustrate methods for securely accessing protected documents using the DRM device, according to an implementation of the present subject matter.
Figure 4B:
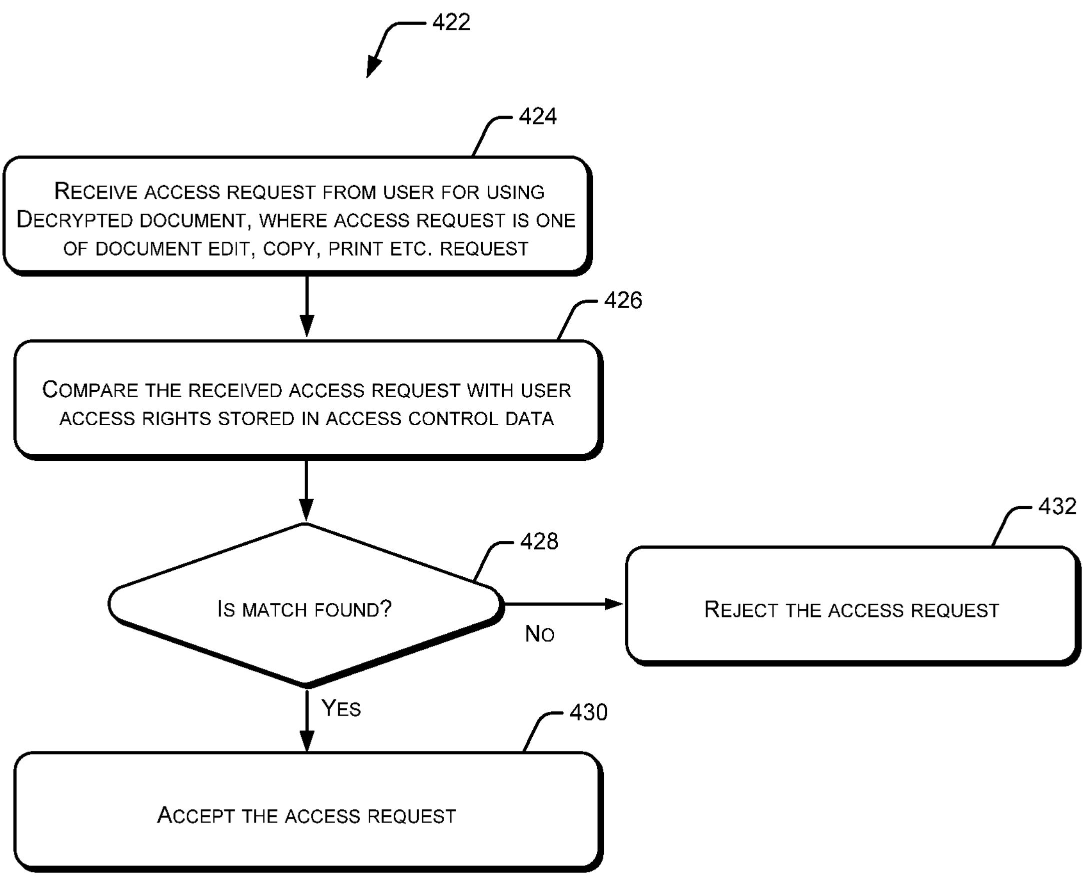

FIG. 3 illustrates a method 300 for protecting documents using the digital rights management (DRM) device 104, in accordance with an implementation of the present subject matter, and FIG. 4*a* and FIG. 4*b* illustrate methods 400, 422 for securely accessing the protected documents through the DRM device 104, in accordance with an implementation of the present subject matter. The methods 300, 400 may be described in the general context of computer executable instructions. Generally, computer executable instructions can include routines, programs, objects, components, data structures, procedures, modules, functions, etc., that perform particular functions or implement particular abstract data types. The methods 300, 400 may also be practiced in a distributed computing environment where functions are performed by remote processing devices that are linked through a communications network. In a distributed computing environment, computer executable instructions may be located in both local and remote computer storage media, including memory storage devices.

The order in which the methods 300, 400 are described is not intended to be construed as a limitation, and any number of the described method blocks can be combined in any order to implement the methods, or alternative methods. Additionally, individual blocks may be deleted from the methods 300, 400 without departing from the spirit and scope of the subject matter described herein. Furthermore, the methods can be implemented in any suitable hardware, software, firmware, or combination thereof.

Referring to FIG. 3, the method 300 for protecting documents using the DRM device 104 is initiated at block 302, where a document protection request is received from a user, such as an owner or an administrator. The user may select the document, to be protected, through the secure viewer interface. In an implementation, the user may log into the DRM device 104 with login credentials. The login credentials may include a user ID, a password, and domain information. Based on the login credentials, the user is authenticated using authentication techniques known in the art. The authenticated user may access the DRM device 104 for protecting the documents. In operation, the authenticated user may send a content protection request to the DRM device 104 by selecting the documents to be protected. The security module 212 within the DRM device 104 receives such document protection request of the user.

At block 304, in response to the document protection request, the DRM device 104 generates a unique security key. A copy of the security key is saved on the DRM device 104 and another copy of the security key is sent to the DRM server 102. The DRM device 104 encrypts the document using the security key to generate a protected document.

At block 306, a request to assign a classification tag to the document is received. The classification tag is selected from a predefined classification scheme by the owner or the administrator while protecting the document. The owner or the administrator selects the classification tag depending on the sensitivity level of the contents of the document. The classification module 108 of the DRM device 104 receives the classification tag assigning request of the owner or the administrator. In an implementation, the classification tag may be assigned to the document while encrypting the document.

At block 308, the selected classification tag is assigned to the document. The classification module 108 of the DRM device 104 assigns the classification tag to the document and saves the information in the classification data 218 of the DRM device 104 and the DRM server 102.

At block 310, a request to selectively assign access rights for the document to a user is received. The assignor, such as the owner and the administrator, may assign specific access rights to users for protected documents. The access rights may include, but are not limited to, rights to open, edit, copy, and print the protected documents. The assignor may not be able to assign access rights in conflict with the access rights predefined based on the classification tag. The access rights assignment information is stored in the access control data 220 of the DRM device 104 and DRM server 102, at block 312. In operation, the access assigning module 226 stores the access rights assignment information in the DRM device 104 and the DRM server 102. It is to be understood that the DRM device 104 or the DRM server 102 may store such information in an associated external repository.

At block 314, a check for any updation in the assignment of the access rights is conducted. Such updation, for example, may include adding new access rights, or revoking previously granted access rights, by the assignor, considering that the new access rights are not in conflict with the predefined access rights. If any updation is required, the access rights are updated and the updated access rights assignment information is stored in the DRM device 104 and the DRM server 102. In operation, an access assigning module 226 updates the access rights, and store the updated access rights assignment information in the DRM device 104 and the DRM server 102. It is to be understood that the DRM device 104 or the DRM server 102 may store such information in an associated external repository.

FIG. 4*a* illustrates a method 400 for securely accessing the protected documents through a DRM device 104, in accordance with an implementation of the present subject matter. At block 402, an access request is received from a user for accessing a protected document, where the access request is a document open request. The document open request may be understood as a request for opening a protected document. In an implementation, the access control module 110 within the DRM device 104 receives the access request.

At block 404, upon receiving the access request, a check is made to determine if the user making the access request is a locked user or the document for which access request is made is a locked document. The determination of locked documents or locked users is made by accessing locking information stored in the DRM device 104 or the DRM server 102. It is to be understood that the DRM device 104 or the DRM server 102 maintains a table containing user information, such as user ID, and a documents information, such as a documents ID. Along with each user ID and documents ID, a locking information is also stored therein in form of a lock status, which indicates if the user ID and/or the document ID is 'Locked' or 'Not_locked'. If the determination yields that the user and/or document is locked ("Yes" branch from block 404), the access request of the user is rejected at block 406 and an error code or an alert message indicating that the user and/or the documents is locked may be displayed to the user on the DRM device 104. However, if the user or the document is not locked ("No" branch from block 404), a further determination is made for ascertaining whether the user is the document owner or not at block 408.

At block 408, if the determination yields that the user is the document owner ("Yes branch from block 408), the DRM device 104 retrieves and filters the access rights of the owner, at block 414. The filtering of the access rights, at block 414, is done such that the access rights assigned to the owner are not in conflict with predefined access rights based on the classification tag of the document, as detailed in implementation shown by Table 2. In an implementation, the access control module 110 retrieves and fitters the access rights. After retrieving and filtering the access rights, the protected document is decrypted for access at block 420. However, if the determination yields that the user is not the document owner ("No branch from block 408), a further determination is made to ascertain whether the user is a temporary owner or not at block 410.

At block 410, if the determination indicates that the user has the ownership rights from the owner and is the temporary owner of the document ("Yes" branch from block 410), a further check is performed at the block 412 to determine if the time period of temporary ownership for that document based on its classification tag has expired or not. If the determination indicates that the time period of the temporary ownership has not expired ("No" branch from block 412), the DRM device 104 retrieves and titters the access rights assigned to the temporary owner at block 414. Again, the filtering of the access rights, at block 414, is done such that the access rights assigned to the temporary owner are not in conflict with the predefined access rights based on the classification tag of the document. After retrieving and filtering the access rights, the protected document gets decrypted for access at block 420.

On the other hand, if the determination indicates that the user is not the temporary owner of the document ("No" branch from block 410), or if the user is found to be the temporary owner but the time period of temporary ownership for that document has expired ("Yes" branch from block 412), the access rights assigned or delegated, if any, to the regular user are retrieved and filtered at block 416, such that the access rights assigned to the regular user are not in conflict with the predefined access rights based on the classification tag of the document. Further, at block 418, a determination is made if the access requested by the regular user, i.e., the document open request matches with any of the retrieved access rights. If the determination indicates that the requested access right matches with the retrieved access right ("Yes" branch from block 418), the protected document gets decrypted, at block 420. However, if the determination indicates that the requested access right does not match with any of the retrieved access rights ("No" branch from block 418), the DRM device 104 rejects the access request of the user.

FIG. 4*b* illustrates a method 422 for securely accessing one or more open protected documents, according to an embodiment of the present subject matter. In an implementation, the method 422 may be initiated in continuation to the method 400; and, in an implementation, the method 422 may be initiated independently of method 400. At block 424, an access request is received from the user, where the access request is one of the document edit request, document copy request, and document print request. In an implementation, the access assigning, module 226 receives the access request from the user.

At block 426, the access requested by the user is compared with the access rights of the user stored in the access control data 220. In an implementation, the access assigning module 226 compares the access requested with the access rights corresponding to the user stored in the access control data 220.

At block 428, a determination is made to determine if the access requested matches with any of the access rights of the user stored in access control data 220 ("Yes" branch from block 428), access request of the user is accepted. Accepting the access request of the user means that the user is allowed to perform the access requested by the user. However, if the determination made at block 428 yields that the access requested by the user does not match with any of the access rights of the user stored in access control data 220 ("No" branch from block 428), access request of the user is rejected at block 432. Rejecting the access request of the user means that the user is restricted from performing the access requested by the user. In an implementation, the access restricting module 228 restricts the user from performing the requested operation.

The methods described in FIG. 4*a* and FIG. 4*b* for securely accessing the protected documents are also applicable for accessing the protected documents in offline mode, where the DRM device 104 is not in communication with the DRM server 102.

Although implementations for the DRM device 104 have been described in language specific to structural features and/or methods, it is to be understood that the invention is not necessarily limited to the specific features or methods described. Rather, the specific features and methods are disclosed as exemplary implementations for the DRM device 104.

We claim:

1. A method for controlling access to a protected document for a user on a computing device having a processor, the method comprising:

assigning, by the processor, a classification tag to the protected document, wherein the classification tag is assigned from a predefined classification scheme, the classification tag representing a level of sensitivity of contents in the protected document;

monitoring, by the processor, a lock status of the protected document, wherein the lock status of the protected document is "Not_Locked" by default, and wherein the monitoring comprises checking the lock status of the protected document at a predefined time interval, wherein the predefined time interval is based on the classification tag assigned to the protected document; and locking the protected document, by the processor, when one of an owner of the protected document and an administrator changes the lock status of the protected document from "Not_Locked" to "Locked".

2. The method as claimed in claim 1, wherein the locking comprises one of:

closing, by the processor, the protected document if the document is open; and rejecting, by the processor, a request to open the protected document.

3. The method as claimed in claim 1, wherein the method comprises:

assigning, by the processor, offline access of the protected document to the user for a predefined time period, and wherein the predefined time period is based on the classification tag assigned to the protected document.

4. The method as claimed in claim 1, wherein the method comprises:

delegating, by the processor, access rights for the protected document from the user to another user, based on the classification tag assigned to the protected document.

5. The method as claimed in claim 1, wherein the method comprises:

assigning, by the processor, access rights for the protected document to the user, based on the classification tag assigned to the protected document.

6. The method as claimed in claim 1, wherein the method comprises:

receiving, by the processor, from an assignor, access rights for the protected document to be assigned to the user; and assigning, by the processor, the access rights to the user for accessing the protected document.

7. The method as claimed in claim 1, wherein the method comprises:

assigning, by the processor, temporary ownership of the protected document to the user for a predefined time period, and wherein the predefined time period is based on the classification tag assigned to the protected document.

8. The method as claimed in claim 1, wherein the user has a lock status of "Not_Locked" by default, wherein the method comprises:

checking, by the processor, the lock status of the user at a predefined time interval; and locking the user, by the processor, when the administrator changes the lock status of the user from "Not_Locked" to "Locked", wherein the locking of the user comprises one of:

closing, by the processor, the protected document if the document is open and accessed by the user; and rejecting, by the processor, a request to open the protected document by the user.

9. The method as claimed in claim 1, wherein the method comprises:

receiving, by the processor, the classification tag for the protected document from an assignor, wherein the assignor is one of the owner of the protected document and the administrator.

10. A computing device for controlling access to a protected document for a user, the computing device comprising:

a processor; and a memory coupled to the processor, the memory comprising:

a classification module, stored in the memory and executable by the processor to assign a classification tag to the protected document, wherein the classification tag is selected for the protected document from a predefined classification scheme, the classification tag representing a level of sensitivity of contents in the protected document; and an access control module, stored in the memory and executable by the processor to:

check a lock status of the protected document at a predefined time interval, wherein the lock status of the protected document is "Not_Locked" by default, and wherein the predefined time interval is based on the classification tag of the protected document; and lock the protected document when one of an owner of the protected document and an administrator changes the lock status of the protected document from "Not_Locked" to "Locked".

11. The computing device as claimed in claim 10, wherein the access control module performs one of:

close the protected document, based on the lock status, if the protected document is open; and reject a request to open the protected document, based on the lock status.

12. The computing device as claimed in claim 10, wherein the access control module assigns an offline access of the protected document to the user for a predefined time period, wherein the predefined time period is based on the classification tag assigned to the protected document.

13. The computing device as claimed in claim 10, wherein the access control module delegates access rights of the user to another user, based on the classification tag assigned to the protected document.

14. The computing device as claimed in claim 10, wherein the access control module assigns access rights for the protected document to the user, based on the classification tag assigned to the protected document.

15. The computing device as claimed in claim 10, wherein the access control module assigns access rights, selected by an assignor, to the user for accessing the protected document.

16. The computing device as claimed in claim 10, wherein the access control module assigns temporary ownership of the protected document to the user for a predefined time period, wherein the predefined time period is based on the classification tag assigned to the protected document.

17. The computing device as claimed in claim 10, wherein the user has a lock status of "Not_Locked" by default, wherein the access control module:

checks the lock status of the user at a predefined time interval; and locks the user when the administrator changes the lock status of the user from "Not_Locked" to "Locked", wherein the user is locked by performing one of:

closing the protected document if the document is open and accessed by the user; and rejecting a request to open the protected document by the user.

18. The computing device as claimed in claim 10, wherein the computing device comprises:

a security module, stored in the memory and executable by the processor to:

generate a security key;

encrypt a document using the security key; and generate the protected document based on the encryption.

19. A non-transitory computer-readable medium having computer-executable instructions that when executed perform acts comprising:

assigning a classification tag to a protected document, wherein the classification tag is selected for the protected document from a predefined classification scheme, the classification tag representing a level of sensitivity of contents in the protected document;

checking a lock status of the protected document at a predefined time interval, wherein the protected document has a lock status of "Not_Locked" by default, and wherein the predefined time interval is based on the classification tag assigned to the protected document; and locking the protected document when one of an owner of the protected document and an administrator changes the lock status of the protected document from "Not_Locked" to "Locked".

* * * * *